(12) United States Patent
Brunnett et al.

(10) Patent No.: US 6,950,967 B1
(45) Date of Patent: Sep. 27, 2005

(54) METHOD AND APPARATUS FOR MANUFACTURE TEST PROCESSING A DISK DRIVE INSTALLED IN A COMPUTER SYSTEM

(75) Inventors: Don Brunnett, Pleasanton, CA (US); John L. Seabury, Erie, CO (US)

(73) Assignee: Maxtor Corporation, Longmont, CO (US)

( * ) Notice: Subject to any disclaimer, the term of this patent is extended or adjusted under 35 U.S.C. 154(b) by 435 days.

(21) Appl. No.: 09/965,595

(22) Filed: Sep. 26, 2001

(51) Int. Cl.[7] .............................................. G06F 11/00
(52) U.S. Cl. ........................ 714/42; 360/53; 369/53.17
(58) Field of Search ............................. 714/42, 40, 8, 714/25; 360/31, 53, 77.04; 369/53.17

(56) References Cited

U.S. PATENT DOCUMENTS

| | | | |
|---|---|---|---|
| 4,628,379 A | 12/1986 | Andrews, Jr. et al. | 360/77 |
| 5,615,335 A * | 3/1997 | Onffroy et al. | 714/30 |
| 5,666,237 A | 9/1997 | Lewis | 360/75 |
| 5,914,828 A | 6/1999 | Brunet et al. | 360/69 |
| 5,937,435 A | 8/1999 | Dobbek et al. | 711/202 |
| 5,943,640 A | 8/1999 | Macpherson | 702/183 |
| 6,289,484 B1 * | 9/2001 | Rothberg et al. | 714/769 |
| 6,327,106 B1 * | 12/2001 | Rothberg | 360/53 |
| 6,467,054 B1 * | 10/2002 | Lenny | 714/42 |
| 6,587,302 B2 * | 7/2003 | Ahn | 360/77.04 |
| 6,636,985 B1 * | 10/2003 | Ono et al. | 714/8 |
| 6,691,255 B1 * | 2/2004 | Rothberg et al. | 714/42 |
| 6,707,635 B1 * | 3/2004 | Codilian et al. | 360/77.04 |
| 2002/0034038 A1 * | 3/2002 | Ahn | 360/77.04 |

* cited by examiner

Primary Examiner—Robert Beausoliel
Assistant Examiner—Marc M. Duncan
(74) Attorney, Agent, or Firm—David M. Sigmond

(57) ABSTRACT

A disk drive provides manufacture test processing of itself after it is installed and operating within a computer system. The tests include flaw mapping, embedded runout compensation and final drive verification and do not interfere with normal operations of the disk drive.

189 Claims, 7 Drawing Sheets

METHOD AND APPARATUS FOR MANUFACTURE TEST PROCESSING A DISK DRIVE INSTALLED IN A COMPUTER SYSTEM

FIELD OF THE INVENTION

The invention relates to a method and apparatus for performing manufacture test processing for a disk drive.

BACKGROUND OF THE INVENTION

Most computer systems include a memory storage device such as a hard disk drive for storing large amounts of data. Hard disk drives typically include a magnetic disk that stores a large amount of binary information. This magnetic disk is typically coupled to a hub that is rotated by an electric motor commonly referred to as a spin motor. In order to write information to and read information from the disk, a head is employed which magnetizes and senses the magnetic field of the disk. The head is commonly referred to as a transducer. The head is typically located at the end of a cantilevered actuator arm that pivots about a bearing assembly mounted on a base plate. The actuator arm has a coil which cooperates with a magnet mounted on the base plate. Providing current to the coil creates torque on the actuator arm and moves the head relative to the disk. The coil and magnet are commonly referred to as a voice coil motor.

The disk drive contains integrated circuits that control the operation of the drive. The circuits typically include a read/write channel that is coupled to the head and an interface controller. The interface controller is coupled to the host computer and a random access memory (RAM) buffer to store data transferred between the disk and the host computer.

Data is recorded on the disk in the form of magnetic transitions spaced closely together. In modern disk drives, recording densities both in terms of tracks per inch and linear density along a track have reached a level which creates extreme sensitivity to imperfections in the disk. These imperfections are known as media defects and occur in the magnetic recording layer of the disk. Media defects cause portions of the magnetic recording layer to be unacceptable for recording the magnetic transitions. Media defects can be small, affecting only a small number of transitions on a small number of tracks, or large, affecting many transitions across multiple tracks.

Manufacturing tests processes are performed on the disk drive at the factory prior to its installation in a computer system. These tests include flaw mapping, embedded runout compensation (ERC) and final drive verification.

Flaw mapping performs a write/verify process over the tracks to identify logical block addresses (LBAs) which possess defects and may not be able to receive and store information. The locations of LBAs with defects are stored in a flaw map. ERC corrects irregularities in the shape of the tracks (cylinders). An error value is generated which indicates the distance between the head and the center of the track at a particular location on the track. The error value provides alignment correction for the head during the read/write process for a particular track on the disk. Final drive verification is a follow-up to flaw mapping that confirms that the LBAs do not contain flaws.

Unfortunately, these manufacture test processes are very time consuming. As the number of tracks in the disk drive has increased, the total number of passes made at each location in performance of these tests has increased which in turn increases the manufacture time for the disk drive.

SUMMARY OF THE INVENTION

The present invention teaches that manufacturing test processes can be automatically performed by the disk drive once it is activated and operational in a computer system rather than in the factory prior to installation of the disk drive.

The present invention performs automated manufacture test processes on a disk drive once the disk drive is installed and operating within a computer system. The invention includes a processing module located in a memory of the disk drive, and the memory can be a processed portion of the disk, a random access memory (RAM), a read only memory (ROM), as well as any combination of these devices. The processing module includes sequences to perform automated tests. The test procedures and other saved information are retrievable by a processor of the disk drive such that the testing is performed at predetermined times.

In an aspect of the invention, the test includes at least one of flaw mapping, embedded runout compensation (ERC) and final drive verification. Flaw mapping includes initiating write/verify tests of LBAs on the disk either during normal write commands for the disk drive or when the computer system is idle. Flaw mapping makes an initial query as to whether any user commands are pending. If a write command is pending, an analysis determines whether the addresses to which the information is to be written are LBAs which have been previously processed. If not, during the write function to these LBAs a verify determines whether the information was stored correctly. If the information was not stored correctly, the LBA is reassigned to a processed area of the disk and a pointer provided at the original location to direct all future read and write functions to the new location. As LBAs are processed, counters are continually updated and saved to track which LBAs have been processed. The processing module also performs a write function in an area which includes both processed and unprocessed LBAs. The processing module performs write functions to processed areas and then perform write/verifies on the unprocessed area before the information is permanently written to a particular LBA.

When there are no user commands pending and the computer system is idle, the processor performs the write/verify tests on LBAs using test information. As an initial step, information is retrieved from memory which indicates which of the LBAs have been tested and which have not. Once the next unprocessed LBAs are identified, the write/verify functions are performed and all LBAs which have flaws are reassigned to a processed area of the disk and pointers are provided at the previous location. Once a particular increment of the LBAs is processed, a pointer is updated and a check made as to whether any user commands are pending.

A further test is embedded runout compensation (ERC). Unlike the flaw mapping, the ERC typically is not performed when a user command is being performed or pending. Instead, the ERC is performed during idle times and an error signal is generated which is stored in memory and provides a correction for the head. An initial query also asks whether a user command is currently pending. If a user command is pending, it is performed and the ERC test is not performed until idle time. If idle time is detected, a counter is accessed from memory to identify which of the cylinders is processed next. To track the completion of the ERC, counters indicate which cylinders have been tested and which have not. Further, various cylinders are not employed during normal operation of the disk drive until an adjacent cylinder has also been tested. Separate pointers track both of these items.

Once the next cylinder to be processed is identified, the ERC for that cylinder is performed and an error signal is generated and stored in memory. Further, the counters that track which cylinders have been processed are updated and stored in memory. Another query then asks whether there are any user commands pending. If there are, those commands are performed, if not, another cylinder is tested until all unprocessed cylinders are processed.

Final drive verification ensures that the LBAs which were tested are not flawed. As with the flaw mapping test described above, this test is automatically initiated either during idle time or performed with write functions as part of user commands. If the final drive verification is performed as part of a user command, previously saved counter information is accessed to determine whether the final drive verification has been performed previously on any of the LBAs to which a write is to occur. If not, the write function is performed on the LBAs and the information is verified. If any errors are detected, the LBAs are reassigned and a pointer is generated to direct all future write functions to the reassigned LBAs. Once the write function is complete, the necessary pointers are updated and a further query asks whether any user commands are pending.

If the computer system is idle, counter information is retrieved from memory and an increment of LBAs are identified for which the final verification test is to be performed. At this point, the information stored on these LBAs is read and verified. If any errors are detected, the effected LBAs are reassigned and a pointer is included in the disk. At this point, the counters are updated and the system returns to its initial query.

In another aspect of the invention, portions of the test described above are performed at the factory prior to the disk drive being installed in the computer system in order to detect any major flaws in the disk. For example, a certain percentage of the LBAs and cylinders at designated locations on the disk are tested to identify any major flaws which extend across multiple LBAs or cylinders.

DETAILED DESCRIPTION

Figure 1:
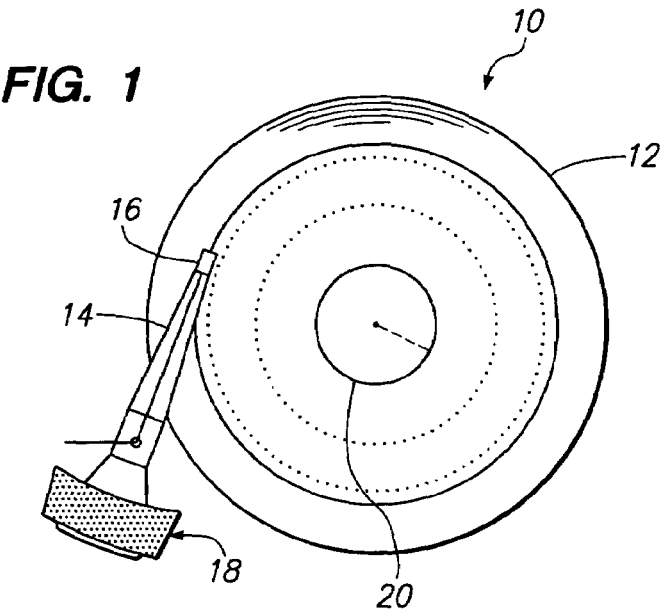
FIG. 1 is a top view of a magnetic disk and an actuator arm in a disk drive.

FIG. 1 shows hard disk drive 10 in accordance with the present invention. Disk drive 10 includes magnetic disk 12, actuator arm 14, read/write head 16, voice coil motor 18 and spin motor 20. Disk 12 is constructed from metal, glass, ceramic or a composite substrate that is covered with a magnetic coating as is known in the art. Disk 12 is rotated by spin motor 20. Disk 12 rotates relative to actuator arm 14 which supports head (or heads) 16. Head 16 contains a coil (not shown) which can magnetize and sense the magnetic field of the corresponding adjacent surface of disk 12. At the opposite end of actuator arm 14 from head 16 is voice coil motor 18. Voice coil motor 18 rotates actuator arm 14 and head 16 such that head 16 is positioned to read or write information on disk 12.

Data is stored on disk 12 along annular tracks concentric within the diameter of disk 12. Disk 12 can have various diameters such as 1.8 inch, 2.5 inch, 3.5 inch, etc. For example, with a 1.8 inch disk, the system will typically store data on a 130 tracks per disk surface. In one configuration, each track contains servo sectors and each sector is capable of storing up to 768 bytes of data. The total assembly is capable of storing up to 130M of data.

Figure 2:
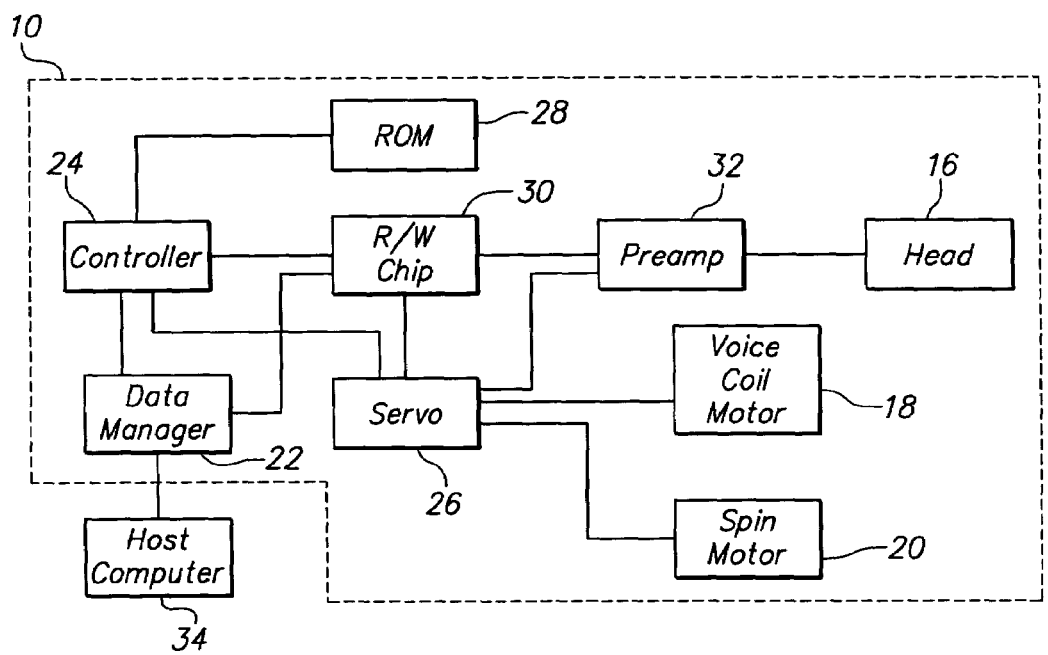
FIG. 2 is an electronic system diagram of the disk drive.

FIG. 2 is a schematic of the electronic system architecture of disk drive 10. The system includes data manager 22, controller 24, servo 26, read only memory (ROM) 28, read/write (R/W) chip 30 and preamp 32. Data manager 22 provides data exchange between disk drive 10 and host computer 34. Controller 24 provides control signals for various electrical components of disk drive 10. For instance, controller 24 is connected to servo 26 which controls the operation of voice coil motor 18 and spin motor 20. Controller 24 is also connected to ROM 28 which stores software that runs disk drive 10. R/W chip 30 controls the read/write functions for data stored on and received from the disk 12 through head 16 and preamp 32.

In operation, disk drive 10 is installed in host computer 34. Disk drive 10 receives a request from host computer 34 for reading or writing data on disk 12. Data manager 22 receives the request from host computer 34 in the form of logical block addresses (LBAs). This information is provided to controller 24 which in turn converts the logical block addresses to physical disk addresses. Controller 24 then initiates a seek routine through servo 26, which in turn moves head 16 to the proper location on disk 12. When voice coil motor 18 has moved head 16 to the desired disk sector, controller 24 provides a z-sector signal to data manager 22. Upon receiving the z-sector signal, the read or write function is initiated and the necessary functions performed using head 16, R/W chip 30 and preamp 32. The data extracted by R/W chip 30 is provided through data manager 22 to host computer 34.

To ensure that disk drive 10 operates in host computer 34 substantially as described above, a number of manufacturing tests processes are performed on disk drive 10. Typically, the manufacturing test processes are performed at the factory prior to installation of disk drive 10 in host computer 34. According to the present invention, while some manufacturing tests can be performed prior to installing disk drive 10 in host computer 34, other manufacturing tests can be performed while disk drive 10 is installed and operating within host computer 34.

Disk drive 10 is equipped with the functionality to perform a number of automated self test procedures. In the embodiment described herein, the self test procedures include flaw mapping, embedded runout compensation (ERC) and final drive verification. In view of the teachings of the present invention, one skilled in the art would realize that any number of tests can be performed in an automated fashion while disk drive 10 is installed and operating in host computer 34. These tests fall within the scope of the present invention.

During the manufacture of disk drive 10, manufacturing tests such as drive functionality and data optimization are performed at the factory. Additionally, flaw mapping, ERC and final drive verification are performed over a limited area of disk 12 to assure there are no major flaws in disk 12. Therefore, a portion of disk 12 is processed and ready to store data once host computer 34 is operational. For example, at the factory, flaw mapping and ERC are performed for the first 10 percent of the LBAs. Disk drive 10 is then flaw mapped and ERC is performed for every N tracks of the remaining disk surface to assure there are no very large defects and predict the total number of defects. A processed pointer is then initialized and stored on disk 12 indicating the portions of disk 12 that have been already processed. Also during the factory manufacturing, an automated test program described below is written into the memory of disk drive 10. The memory can be a processed portion of disk drive 10, a random access memory (RAM), a read only memory (ROM), and any combination of these devices.

Once the manufacturing testing processes at the factory are complete, disk drive 10 is installed in host computer 34. The unprocessed portions of disk 12 are then automatically processed during normal operation of host computer 34. For example, this automated processing occurs during write functions to unprocessed areas of disk 12 and during disk drive idle time (no user commands pending). This testing is substantially interruptible and does not significantly reduce the performance of the disk drive 10 during user commands for read and write functions during normal operation.

As described above, tests performed during normal operation of host computer 34 include flaw mapping, ERC and final drive verification. As part of the flaw mapping and final drive verification, write or read/verify tests are performed which determine whether a particular LBA is able receive data when written to.

Figure 3:
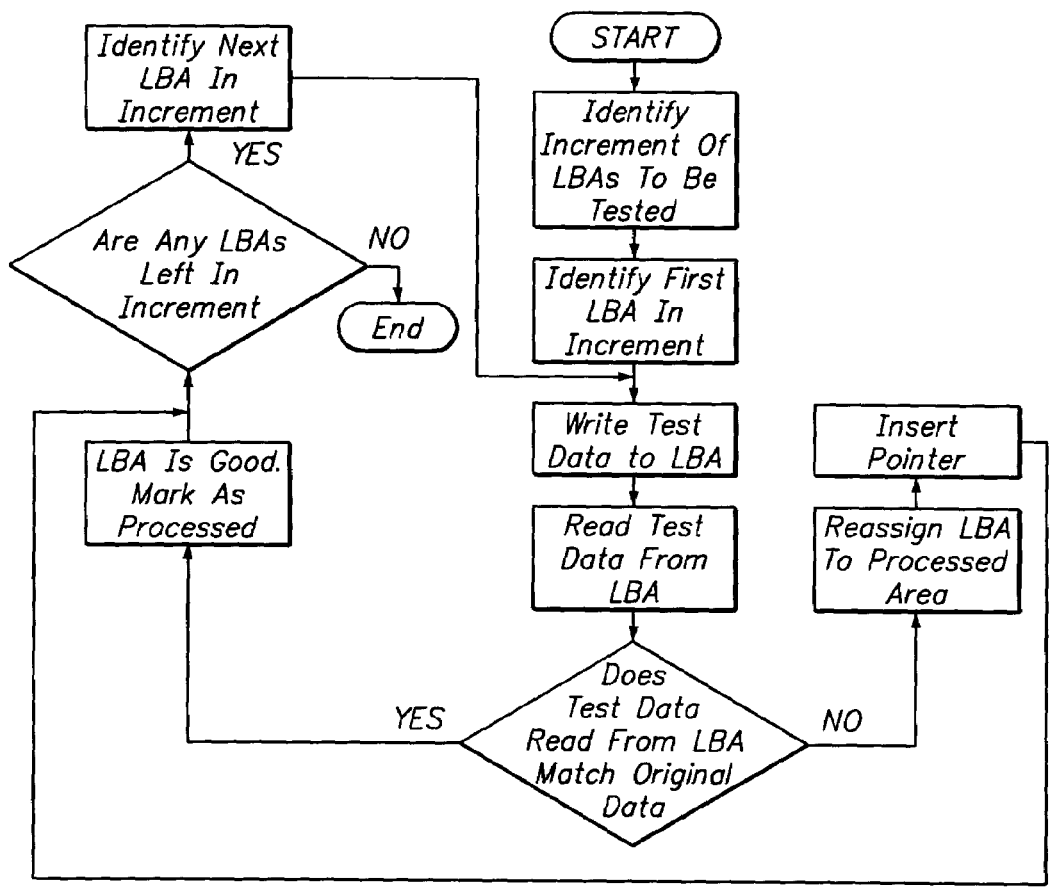
FIG. 3 is a flow chart of the steps performed for a write/verify function during flaw mapping of a disk drive.

FIG. 3 is a flow chart of steps performed during a write/verify test which is employed by the automated test procedures described below. As an initial step a list of LBAs to be analyzed is identified. The first LBA in the list is identified and the test procedure begins with test information being written to the LBA. The LBA is then read and the information read from the LBA is compared against the test information. A determination is then made as to whether the read information is identical to the test information. If any differences in the information read from the LBA are detected, a determination is made that the particular LBA is flawed. If so, the LBA is reassigned to another area on disk 12 and a pointer is placed on disk 12 indicating the new location for the LBA.

If the information read from the LBA matches the test information, the LBA is determined to be functional and the flaw map is updated for disk 12. At this point the next LBA in the particular increment is tested, and the flaw mapping continues until all LBAs in the particular increment are tested.

The flaw mapping process described above is employed as part of the automated flaw mapping procedure for disk drive 10.

Figure 4A:
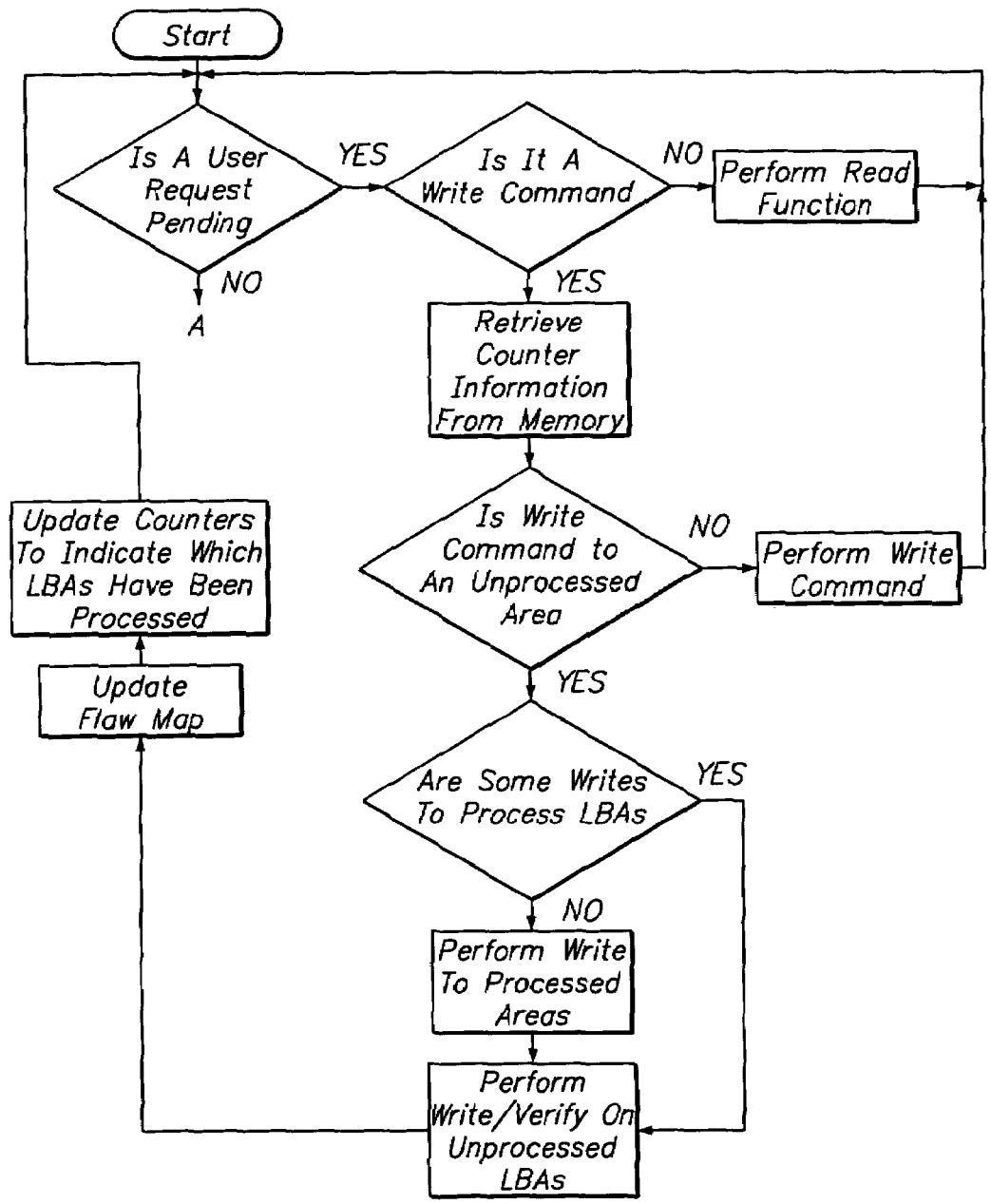
FIGS. 4A and 4B are a flow chart of the steps performed by the disk drive during automated flaw mapping.
Figure 4B:
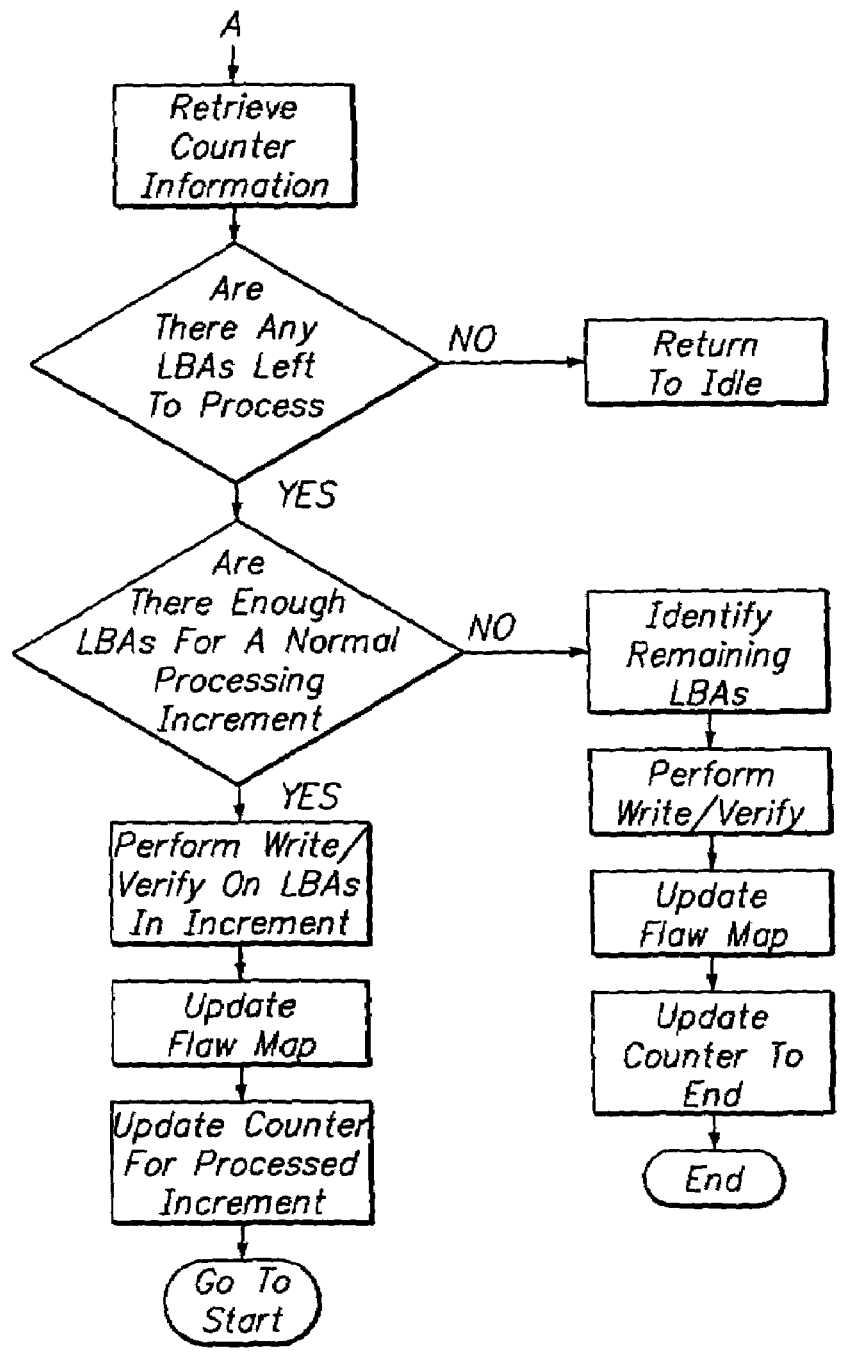

FIGS. 4A and 4B are a flow chart of the steps performed by the automated flaw mapping process once disk drive 10 is installed in host computer 34 and host computer 34 is operational. As an initial step not shown in the flow chart, at start-up of host computer 34, the processor of disk drive 10 issues an instruction to execute a software program, which is either stored on disk 12 or in ROM, to perform the automated tests. Once this software program is loaded and running, the system is ready to initiate the automated self test. As a first step, a query asks whether a user command is currently pending. User commands are instructions which direct disk drive 10 to read or write information on disk 12. If a user command is pending, a determination is made as to whether it is a read or write command. If a read command is detected, disk drive 10 operations proceed normally. If a write command is detected, the process determines whether the LBAs to which the information is to be written are in a processed or unprocessed area of disk 12. When disk 12 is delivered from the factory, certain areas of disk 12 are already flaw mapped and this is recorded on a flaw map for disk drive 10 which is accessible in memory. Further, as different areas of disk 12 are processed through the flaw mapping process, this is indicated in the flaw map.

Returning to FIG. 4A, if the entire area which information is to be written is unprocessed, then disk drive 10 performs a write of the information and then a verify of what has been written. If the write/verify step fails, a reassignment of the LBAs which failed is performed, the information is written to a processed area of disk 12, and a pointer is placed on disk 12 which identifies the location of the reassigned LBAs. The pointer also indicates that the flawed area of disk 12 should not be used.

If it is determined during the write function that a first portion of the data is to be written to an unprocessed area and a second portion is to be written to a processed area, a write is initially performed to the processed area. With regards to the unprocessed area, the write/verify test is performed for the LBAs included therein. If the verify fails, there is a reassignment of the LBAs to new locations on disk 12 and a pointer is provided which redirects all future reads and writes to the new LBAs. In the last scenario, a determination is made that the write is being performed to an area which has been processed. In this case, there is no need to perform an automated test and the write function is performed normally.

In order to track the progress of the testing, counters are incorporated in the automated test program. One counter is the process LBA counter which indicates the last LBA which was processed. During various program cycles the counters are continually updated in case of interruptions due to user commands or power loss.

The system performs the automated tests until the entire disk 12 is analyzed. As such, the automated program tests areas of disk drive 12 during detected idle times. Returning to the initial steps in FIG. 4A, if no user commands are pending, the automated self test disclosed in FIG. 4B is then initiated. Initially, a counter saved in memory is accessed to determine the last increment of LBAs to be processed and identify the next increment of LBAs to be processed. The number of LBAs included in an increment is limited so as not to take enough time to unduly interfere with normal operation of host computer 34. During the time the automated process is performed, disk drive 10 is inaccessible.

Returning to FIG. 4B, an additional query asks whether there are enough LBAs left to be processed for a normal processing increment. If there enough LBAs for an increment, the test information is retrieved and employed in a write/verify step for each LBA. Any LBAs which fail the write/verify test are reassigned and a pointer is provided on disk 12. Once all the LBAs in an increment are tested, the defect map stored in memory is updated, and likewise, the counter which indicates which LBAs have been processed is updated. Another increment of LBAs will be identified and tested unless a new user command is detected or there are no more unprocessed LBAs left.

If there is not a normal increment of LBAs for performing the automated processing, the remaining unprocessed LBAs are automatically tested and the defect map is updated and the number of good LBAs are identified. The LBAs tested are moved from unprocessed space to processed space. The testing program is then updated to indicate that the flaw mapping test is complete.

Figure 5:
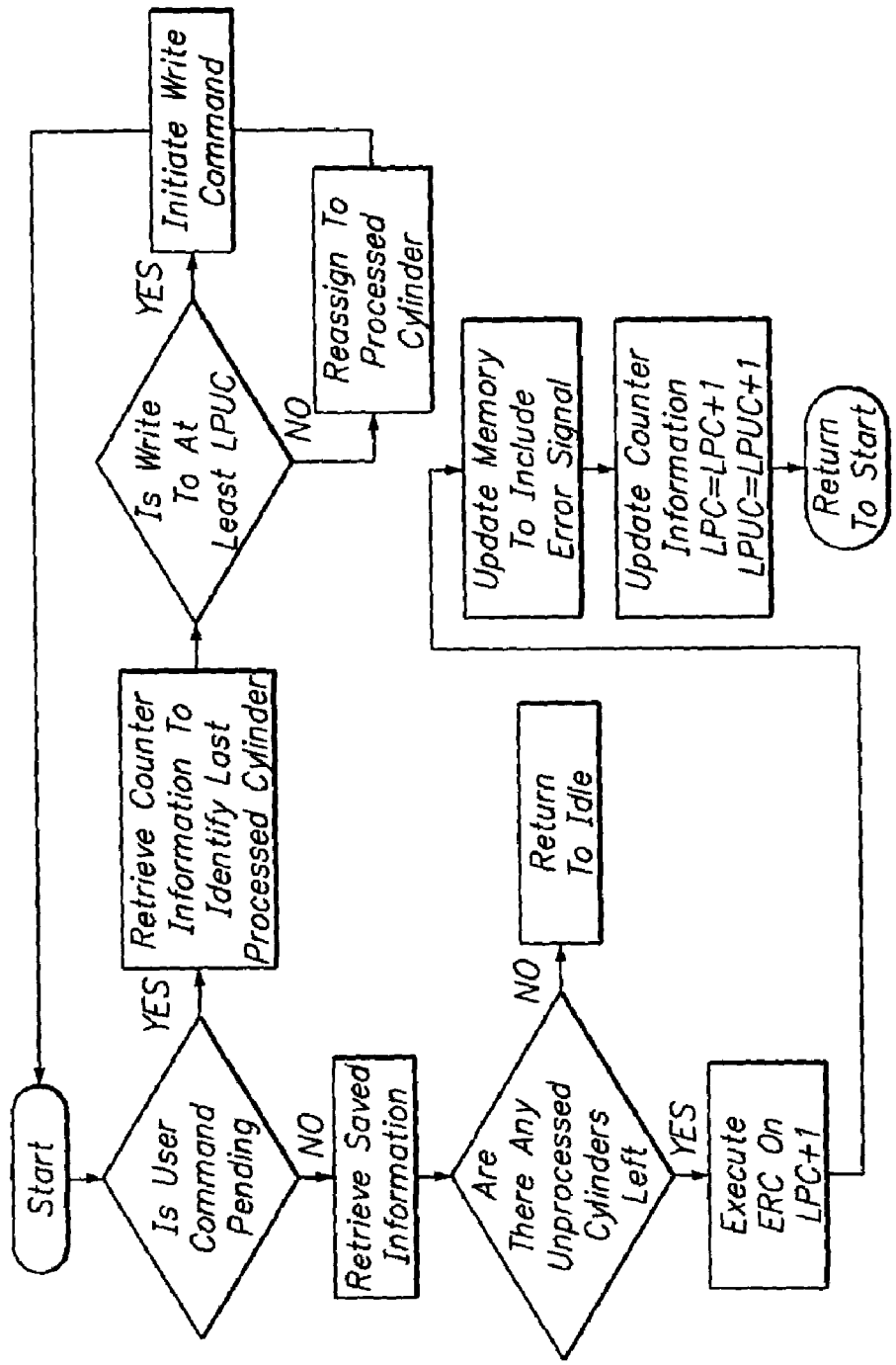
FIG. 5 is a flow chart of the steps performed by the disk drive during automated ERC testing.

FIG. 5 is a flow chart of the steps performed by the automated system when performing ERC. As noted above, a first step (not shown) is the downloading and execution of a program which is either stored in ROM or on a processed area of disk 12. A first query made in the automated test procedure asks whether a user command is pending for reading or writing information on disk 12. If a user command is pending, the system will discontinue performing the automated test functions and perform the requested user commands. After the command is complete, and the system returns to idle mode the query is made again.

If there are not user commands pending, a first query asks whether there are any unprocessed tracks (cylinders) left to be tested. As in flaw mapping, the disk space is broken into three areas. The first (lower) is the process area which includes user LBAs. The second (middle) in the unprocessed area which does not contain user LBAs. The third (top) is the unprocessed area which also contains user LBAs. The ERC is executed from the lower to higher areas until all processing is complete. Since the ERC modifies (straightens) the path of the head, user data will not be moved to the process cylinder until the cylinder being tested (target) and target +1 cylinders have been processed. In order to perform the testing, counters are employed. These include the last process user's cylinder as well as the last process cylinder. The last processed user cylinder indicates the last cylinder which has been processed which is available for storing data. The disk drive is configured at the factory such that the last processed user cylinder equals −1 and the last process cylinder also equals −1.

Returning to FIG. 5, if unprocessed cylinders are left, the last processed cylinder pointer is accessed to determine which cylinder is next to be processed. Once the next cylinder to be processed is identified, the ERC is performed and the error information for that particular cylinder is stored in memory. After this information is generated the various pointers employed are also updated. For example, the last processed cylinder is incremented up one as is the last processed user cylinder. This information is then saved in memory. The process then returns to start and if no user commands are pending the next unprocessed cylinder is processed.

Figure 6A:
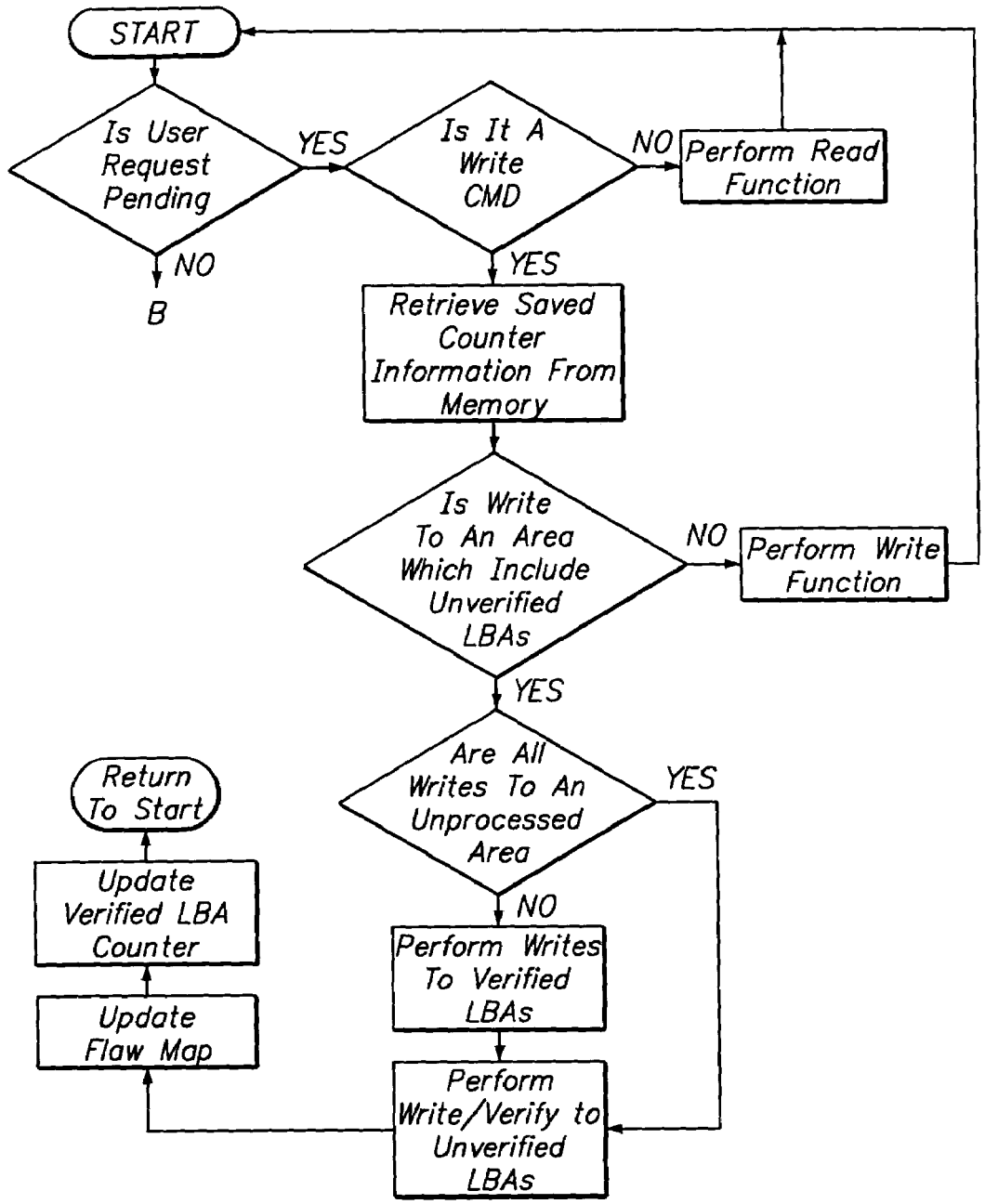
FIG. 6 is a flow chart of the steps performed by the disk drive during automated final drive verification.
Figure 6B:
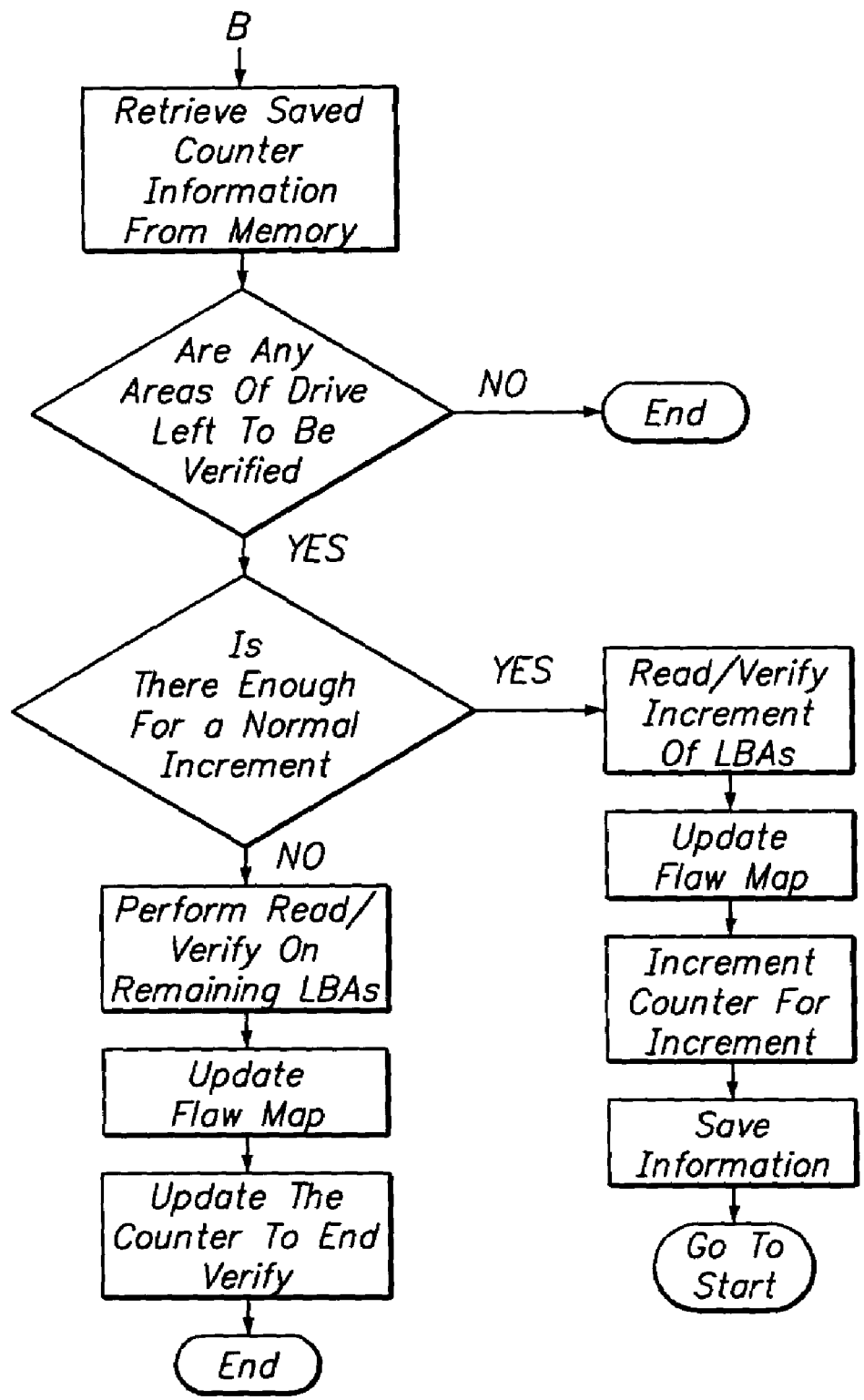

FIGS. 6A and 6B are a flowchart of the steps performed in final drive verification. As an initial step, a query asks whether a user command is pending. If there is a user command pending, the process determines whether it is a read or write command. If it is a read command, the read function is performed without interruption and the automated program returns to its initial query. If it is a write command, yet another query asks whether the write is to a processed or unprocessed area (with regards to the final drive verification test). If the write command is to an area which has been processed, the write function is performed without interruption and the program returns to its initial query.

A query then asks whether the area to which the write command is to be carried out includes any unprocessed LBAs. In particular, a query asks whether all the writes are to an unprocessed area. If this is the case, each LBA to which a write is to occur has a write/verify test performed as described in FIG. 3. All LBAs which fail the write/verify will be reassigned and a pointer provided on disk 12. Further, the flaw map will be updated to indicate the flawed LBAs. When the processing for particular increments of disk drive 12 is performed, the counter which tracks the LBAs which have been processed is updated by adding the processing increments. At this point, the automated program returns to the initial query.

If the area to which information is to be written contains both processed and unprocessed LBAs, all the writes are initially performed to the processed area. Once the unprocessed area is reached, the write/verify test is performed on all of the unprocessed LBAs. At this point, the LBAs which fail are reassigned and pointers are provided at the location. Further, the flaw map is updated, as are the counters which indicate where the future cycles of the test are to begin.

Turning again to the first query of FIG. 6A, if there are no user commands pending, the final drive verification test program retrieves the stored information and counters which indicate where the write/verify test is to continue from. Typically, a predetermined processing increment is employed to identify the number of LBAs which will be tested during a particular cycle of the test. A first query asks whether there are any LBAs left to process. If there are not, the process ends. If there are LBAs to be processed, a further query asks whether there are enough LBAs in a normal processing increment. If there are not, this indicates that the end of the test is about to be reached, and the remaining LBAs are tested. In this situation, because information had been previously written to these LBAs either through the write/verification test and/or during normal operation this information is read from the particular LBA and is checked for accuracy. If an error is detected, the LBA is reassigned and a pointer is provided. The flaw map is then updated and then the LBA pointer is also updated to indicate that all of the LBAs have been read during the final drive verification pass.

If there are enough LBAs to fill a processing increment, the final drive verification test program performs the read verify function on the LBAs in the increment as described above. If any of the LBAs are flawed, the LBA is reassigned and the flaw map is updated. Once the test for an increment is complete, the LBA counter which indicates which LBAs have been processed is incremented upwards. This information is then saved in memory and the test program returns to the initial query.

Disk drive 10 installed in host computer 34 can implement other automated manufacturing test processes, such as servo optimization, data optimization, mechanical check and determination of tolerances of different components in disk drive 10.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An automated manufacture process test system resident upon a disk drive that performs a manufacture test process on the disk drive once the disk drive is installed and operating within a computer system, the test system comprising:
   a monitor that determines whether any user command from the computer system is pending or the computer system is idle;
   a processing module that performs the manufacture test process on a disk of the disk drive, wherein the manufacture test process is performed on a portion of the disk for the first time and in a particular manner depending on whether the computer system has issued the user command or the computer system is idle, the manufacture test process includes at least one of flaw mapping, embedded runout compensation (ERC) and final drive verification, and the processing module performs the flaw mapping such that a first flaw mapping test is performed when a user command for operating the disk drive is pending and a second flaw mapping test is performed when the computer is system is idle; and
   a controller that tracks performance of the manufacture test process such that counters stored in a memory of the disk drive indicate which portion of the disk has been processed by the manufacture test process.

2. The system of claim 1 wherein the first flaw mapping test is performed by identifying logical block addresses (LBAs) on the disk to which information is to be written, determining whether the identified LBAs have been processed, and if the identified LBAs have not been processed, performing a write/verify on each of the LBAs.

3. The system of claim 1 wherein the second flaw mapping test is performed by accessing the memory and identifying an increment of logical block addresses (LBAs) which are unprocessed, performing a write/verify on each of the LBAs in the increment, and updating the memory to indicate which of the LBAs have been processed.

4. The system of claim 1 wherein the processing module performs the ERC when the computer system is idle by accessing the memory to determine which cylinder was last processed, performing the ERC on the next cylinder, and updating the memory to indicate completion of the ERC on the next cylinder.

5. The system of claim 1 wherein the processing module performs the final drive verification such that a first final drive verification test is performed when a user command for operating the disk drive is pending and a second final drive verification test is performed when the computer system is idle.

6. The system of claim 5 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

7. The system of claim 5 wherein the second final drive verification test is performed by accessing the memory and identifying an increment of logical block addresses (LBAs) which are unprocessed, performing a write/verify on each of the LBAs in the increment, and updating the memory to indicate which of the LBAs have been processed.

8. The system of claim 1 wherein a predetermined portion of the disk is processed by the manufacture test process before installation of the disk drive in the computer system, and the portion of the disk drive which has been processed is identified by the controller.

9. The system of claim 8 wherein any major flaw in the disk is detected before the disk drive is installed in the computer system.

10. The system of claim 8 wherein the disk includes concentric tracks and the predetermined portion includes a predetermined percentage of the tracks as well as every Nth of the tracks.

11. A method of performing a manufacture test process for a disk drive, comprising:
   installing the disk drive in a computer system and employing the disk drive for operations of the computer system after the disk drive leaves a factory; then
   detecting a predetermined condition in the computer system, wherein the detected condition includes a user command pending from the computer system and the computer system is idle;
   performing a manufacture test process on a particular area of a disk of the disk drive for the first time in response to the detected condition, wherein the manufacture test process is performed in accordance with information stored in a memory of the disk drive which indicates where the manufacture test process shall begin and end, the manufacture test process corrects errors detected on the disk, the manufacture test process includes at least one of flaw mapping, embedded runout compensation (ERC) and final drive verification, and the flaw mapping includes:
      determining the detected condition for the computer system;
      if the user command is pending, before performing the user command:
         identifying logical block addresses (LBAs) employed as part of performing the user command;
         accessing the memory to determine if the identified logical block addresses have been previously processed;
         if any of the LBAs are unprocessed performing a write/verify on each of the unprocessed LBAs and reassigning any of the unprocessed LBAs which fail the write/verify; and
         updating the memory to indicate which of the unprocessed LBAs have been processed;
      if the computer system is idle:
         accessing the memory and identifying a next increment of LBAs to process;
         performing the write/verify on each of the LBAs in the increment;
         reassigning the LBAs in the increment which fail the write/verify; and
         updating the memory to indicate that the LBAs in the increment have been processed; and
   updating the memory to indicate upon which portions of the disk the manufacture test process has been performed.

12. The method of claim 11 wherein the ERC includes:
   determining the detected condition for the computer system; and
   if the computer system is idle:
      accessing the memory and identifying a next cylinder to process;
      performing the ERC on the next cylinder, and storing in the memory any generated error values; and
      updating the memory to indicate that the next cylinder has been processed.

13. The method of claim 11 wherein the final drive verification includes:
   determining the detected condition for the computer system;
   if the user command is pending, before performing the user command:
      identifying logical block addresses (LBAs) employed as part of performing the user command;
      accessing the memory to determine if the identified logical block addresses have been previously processed;
      if any of the LBAs are unprocessed, performing a write/verify on each of the unprocessed LBAs and reassigning any of the unprocessed LBAs which fail the write/verify; and
      updating the memory to indicate which of the unprocessed LBAs have been processed;
   if the computer system is idle:
      accessing the memory and identifying a next increment of LBAs to process;
      performing the read/verify on each of the LBAs in the increment;
      reassigning the LBAs in the increment which fail the read/verify; and
      updating the memory to indicate that the LBAs in the increment have been processed.

14. The method of claim 11 including performing the manufacture test process prior to installation of the disk drive in the computer system to identify a major flaw on the disk.

15. The method of claim 14 wherein the disk includes concentric tracks and performing the manufacture test process prior to installation of the disk drive in the computer system includes testing a predetermined percentage of the tracks as well as every Nth track of the tracks.

16. The method of claim 11 wherein a program for performing the manufacturing test process is placed in the memory before installing the disk drive in the computer system.

17. A disk drive, comprising:
   a disk with spaced tracks for storing information;
   a head that reads and writes information to and from the disk;
   a memory;
   a processing module stored in the memory that performs a manufacture test process on the disk while the disk drive is installed and operating in a computer system, wherein the manufacture test process includes at least one of flaw mapping, embedded runout compensation (ERC) and final drive verification, and the processing module performs the flaw mapping such that a first flaw mapping test is performed when a user command for operating the disk drive is pending and a second flaw mapping test is performed when the computer system is idle; and
   a controller that executes the manufacture test process on a portion of the disk for the first time in response to a predetermined condition of the computer system configured to control operation of the head when the computer system is idle.

18. The disk drive of claim 17 wherein the memory is a read only memory (ROM).

19. The disk drive of claim 17 wherein the memory is a processed area of the disk.

20. The disk drive of claim 17 wherein the first flaw mapping test is performed by identifying logical block addresses (LBAs) on the disk, determining whether the identified LBAs have been processed, and if the identified LBAs have not been processed, performing a write/verify on each of the LBAs.

21. The disk drive of claim 17 wherein the second flaw mapping test is performed by accessing the memory and identifying an increment of logical block addresses (LBAs) which are unprocessed, performing a write/verify on each of the LBAs in the increment, and updating the memory to indicate which of the LBAs have been processed.

22. The disk drive of claim 17 wherein the processing module performs the ERC when the computer system is idle by accessing the memory to determine which cylinder was last processed, performing the ERC on the next cylinder, and updating the memory to indicate completion of the ERC on the next cylinder.

23. The disk drive of claim 17 wherein the processing module performs the final drive verification such that a first final drive verification test is performed when a user command for operating the disk drive is pending and a second final drive verification test when the computer system is idle.

24. The disk drive of claim 23 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

25. The disk drive of claim 23 wherein the second final drive verification test is performed by accessing memory and identifying an increment of logical block addresses (LBAs) which are unprocessed, performing a write/verify on each of the LBAs in the increment, and updating the memory to indicate which of the LBAs have been processed.

26. The disk drive of claim 17 wherein the disk drive performs the manufacture test process on a predetermined portion of the disk before the disk drive is installed in the computer system.

27. The disk drive of claim 26 wherein the disk drive detects any major flaws in the disk before the disk drive is installed in the computer system.

28. The disk drive of claim 26 wherein the predetermined portion includes a predetermined percentage of the tracks as well as every Nth of the tracks.

29. A disk drive, comprising:
   a disk that includes spaced tracks for storing information;
   a head that reads and writes information to and from the disk; and
   a controller that executes a manufacture test process stored in the disk drive (1) on a first portion of the disk and not a second portion of the disk while the disk drive is manufactured at a factory and before the disk drive is installed and operating in a computer system, and (2) on the second portion of the disk for the first time after the disk drive is manufactured at the factory and while the disk drive is installed and operating in the computer system.

30. The disk drive of claim 29 wherein the manufacture test process includes at least one of flaw mapping, embedded runout compensation (ERC) and final drive verification.

31. The disk drive of claim 29 wherein the manufacture test process includes the flaw mapping.

32. The disk drive of claim 31 wherein the controller executes the flaw mapping on the second portion of the disk such that a first flaw mapping test is performed when a user command for operating the disk drive is pending and a second flaw mapping test is performed when the computer system is idle.

33. The disk drive of claim 32 wherein the first flaw mapping test is performed by identifying logical block addresses (LBAs) on the disk, determining whether the identified LBAs have been processed, and if the identified LBAs have not been processed, performing a write/verify on each of the LBAs.

34. The disk drive of claim 32 wherein the second flaw mapping test is performed by identifying an increment of logical block addresses (LBAs) which are unprocessed, performing a write/verify on each of the LBAs in the increment, and updating which of the LBAs have been processed.

35. The disk drive of claim 32 wherein:
the first flaw mapping test is performed by identifying logical block addresses (LBAs) on the disk, determining whether the identified LBAs have been processed, and if the identified LBAs have not been processed, performing a write/verify on each of the LBAs; and
the second flaw mapping test is performed by identifying an increment of logical block addresses (LBAs) which are unprocessed, performing a write/verify on each of the LBAs in the increment, and indicating which of the LBAs have been processed.

36. The disk drive of claim 29 wherein the manufacture test process includes the ERC.

37. The disk drive of claim 36 wherein the controller executes the ERC by determining which cylinder was last processed, performing the ERC on the next cylinder, and indicating completion of the ERC on the next cylinder.

38. The disk drive of claim 29 wherein the manufacture test process includes the final drive verification.

39. The disk drive of claim 38 wherein the controller executes the final drive verification such that a first final drive verification test is performed when a user command for operating the disk drive is pending and a second final drive verification test when the computer system is idle.

40. The disk drive of claim 39 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

41. The disk drive of claim 39 wherein the second final drive verification test is performed by identifying an increment of logical block addresses (LBAs) which are unprocessed, performing a write/verify on each of the LBAs in the increment, and indicating which of the LBAs have been processed.

42. The disk drive of claim 39 wherein:
the first final drive verification test is performed by identifying logical block addresses (LBAs) on the disk to which information is to be written, determining whether the identified LBAs have been processed, and if the identified LBAs have not been processed, performing a write/verify on each of the LBAs; and
the second final drive verification test is performed by identifying an increment of logical block addresses (LBAs) which are unprocessed, performing a write/verify on each of the LBAs in the increment, and indicating which of the LBAs have been processed.

43. The disk drive of claim 29 wherein the controller executes the manufacture test process on the first portion of the disk such that any major flaws in the disk are detected.

44. The disk drive of claim 29 wherein the first portion of the disk includes a predetermined percentage of the tracks as well as every Nth of the tracks.

45. The disk drive of claim 29 wherein the manufacture test process is stored in a random access memory (RAM) in the disk drive.

46. The disk drive of claim 29 wherein the manufacture test process is stored in a read only memory (ROM) in the disk drive.

47. The disk drive of claim 29 wherein the manufacture test process is stored in the first portion of the disk.

48. The disk drive of claim 29 wherein the first portion of the disk is smaller than the second portion of the disk.

49. A disk drive, comprising:
a disk with spaced tracks for storing information;
a head that reads and writes information to and from the disk; and
a controller that executes a manufacture test process stored in the disk drive (1) on a first portion of the disk and not a second portion of the disk while the disk drive is manufactured at a factory and before the disk drive is delivered from the factory and installed and operating in a computer system, and (2) on the second portion of the disk for the first time after the disk drive is manufactured at and delivered from the factory and while the disk drive is installed and operating in the computer system, thereby reducing manufacturing time for the disk drive at the factory.

50. The disk drive of claim 49 wherein the manufacture test process includes at least one of flaw mapping, embedded runout compensation (ERC) and final drive verification.

51. The disk drive of claim 49 wherein the manufacture test process includes the flaw mapping.

52. The disk drive of claim 51 wherein the controller executes the flaw mapping on the second portion of the disk such that a first flaw mapping test is performed when a user command for operating the disk drive is pending and a second flaw mapping test is performed when the computer system is idle.

53. The disk drive of claim 52 wherein the first flaw mapping test is performed by identifying logical block addresses (LBAs) on the disk, determining whether the identified LBAs have been processed, and if the identified LBAs have not been processed, performing a write/verify on each of the LBAs.

54. The disk drive of claim 52 wherein the second flaw mapping test is performed by identifying an increment of logical block addresses (LBAs) which are unprocessed, performing a write/verify on each of the LBAs in the increment, and updating which of the LBAs have been processed.

55. The disk drive of claim 52 wherein:
the first flaw mapping test is performed by identifying logical block addresses (LBAs) on the disk, determining whether the identified LBAs have been processed, and if the identified LBAs have not been processed, performing a write/verify on each of the LBAs; and
the second flaw mapping test is performed by identifying an increment of logical block addresses (LBAs) which are unprocessed, performing a write/verify on each of the LBAs in the increment, and indicating which of the LBAs have been processed.

56. The disk drive of claim 49 wherein the manufacture test process includes the ERC.

57. The disk drive of claim 56 wherein the controller executes the ERC by determining which cylinder was last processed, performing the ERC on the next cylinder, and indicating completion of the ERC on the next cylinder.

58. The disk drive of claim 49 wherein the manufacture test process includes the final drive verification.

59. The disk drive of claim 58 wherein the controller executes the final drive verification such that a first final drive verification test is performed when a user command for operating the disk drive is pending and a second final drive verification test when the computer system is idle.

60. The disk drive of claim 59 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

61. The disk drive of claim 59 wherein the second final drive verification test is performed by identifying an increment of logical block addresses (LBAs) which are unprocessed, performing a write/verify on each of the LBAs in the increment, and indicating which of the LBAs have been processed.

62. The disk drive of claim 59 wherein:
the first final drive verification test is performed by identifying logical block addresses (LBAs) on the disk to which information is to be written, determining whether the identified LBAs have been processed, and if the identified LBAs have not been processed, performing a write/verify on each of the LBAs; and
the second final drive verification test is performed by identifying an increment of logical block addresses (LBAs) which are unprocessed, performing a write/verify on each of the LBAs in the increment, and indicating which of the LBAs have been processed.

63. The disk drive of claim 49 wherein the controller executes the manufacture test process on the first portion of the disk such that any major flaws in the disk are detected.

64. The disk drive of claim 49 wherein the first portion of the disk includes a predetermined percentage of the tracks as well as every Nth of the tracks.

65. The disk drive of claim 49 wherein the manufacture test process is stored in a random access memory (RAM) in the disk drive.

66. The disk drive of claim 49 wherein the manufacture test process is stored in a read only memory (ROM) in the disk drive.

67. The disk drive of claim 49 wherein the manufacture test process is stored in the first portion of the disk.

68. The disk drive of claim 49 wherein the first portion of the disk is smaller than the second portion of the disk.

69. A disk drive, comprising:
a disk with spaced tracks for storing information;
a head that reads and writes information to and from the disk;
a controller that executes a manufacture test process stored in the disk drive (1) on a first portion of the disk and not a second portion of the disk using the head while the disk drive is manufactured at a factory and before the disk drive is installed and operating in a computer system, and (2) on the second portion of the disk for the first time using the head after the disk drive is manufactured at the factory and while the disk drive is installed and operating in the computer system.

70. The disk drive of claim 69 wherein the manufacture test process includes at least one of flaw mapping, embedded runout compensation (ERC) and final drive verification.

71. The disk drive of claim 69 wherein the manufacture test process includes the flaw mapping.

72. The disk drive of claim 71 wherein the controller executes the flaw mapping on the second portion of the disk such that a first flaw mapping test is performed when a user command for operating the disk drive is pending and a second flaw mapping test is performed when the computer system is idle.

73. The disk drive of claim 72 wherein the first flaw mapping test is performed by identifying logical block addresses (LBAs) on the disk, determining whether the identified LBAs have been processed, and if the identified LBAs have not been processed, performing a write/verify on each of the LBAs.

74. The disk drive of claim 72 wherein the second flaw mapping test is performed by identifying an increment of logical block addresses (LBAs) which are unprocessed, performing a write/verify on each of the LBAs in the increment, and updating which of the LBAs have been processed.

75. The disk drive of claim 72 wherein:
the first flaw mapping test is performed by identifying logical block addresses (LBAs) on the disk, determining whether the identified LBAs have been processed, and if the identified LBAs have not been processed, performing a write/verify on each of the LBAs; and
the second flaw mapping test is performed by identifying an increment of logical block addresses (LBAs) which are unprocessed, performing a write/verify on each of the LBAs in the increment, and indicating which of the LBAs have been processed.

76. The disk drive of claim 69 wherein the manufacture test process includes the ERC.

77. The disk drive of claim 76 wherein the controller executes the ERC by determining which cylinder was last processed, performing the ERC on the next cylinder, and indicating completion of the ERC on the next cylinder.

78. The disk drive of claim 69 wherein the manufacture test process includes the final drive verification.

79. The disk drive of claim 78 wherein the controller executes the final drive verification such that a first final drive verification test is performed when a user command for operating the disk drive is pending and a second final drive verification test when the computer system is idle.

80. The disk drive of claim 79 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

81. The disk drive of claim 79 wherein the second final drive verification test is performed by identifying an increment of logical block addresses (LBAs) which are unprocessed, performing a write/verify on each of the LBAs in the increment, and indicating which of the LBAs have been processed.

82. The disk drive of claim 79 wherein:
the first final drive verification test is performed by identifying logical block addresses (LBAs) on the disk to which information is to be written, determining whether the identified LBAs have been processed, and if the identified LBAs have not been processed, performing a write/verify on each of the LBAs; and
the second final drive verification test is performed by identifying an increment of logical block addresses (LBAs) which are unprocessed, performing a write/verify on each of the LBAs in the increment, and indicating which of the LBAs have been processed.

83. The disk drive of claim 69 wherein the controller executes the manufacture test process on the first portion of the disk such that any major flaws in the disk are detected.

84. The disk drive of claim 69 wherein the first portion of the disk includes a predetermined percentage of the tracks as well as every Nth of the tracks.

85. The disk drive of claim 69 wherein the manufacture test process is stored in a random access memory (RAM) in the disk drive.

86. The disk drive of claim 69 wherein the manufacture test process is stored in a read only memory (ROM) in the disk drive.

87. The disk drive of claim 69 wherein the manufacture test process is stored in the first portion of the disk.

88. The disk drive of claim 69 wherein the first portion of the disk is smaller than the second portion of the disk.

89. A disk drive, comprising:
a disk that includes spaced tracks for storing information;
a head that reads and writes information to and from the disk; and
a controller that executes a manufacture test process stored in the disk drive (1) on a first portion of the disk and not a second portion of the disk while the disk drive is manufactured at a factory and before the disk drive is installed and operating in a computer system, and (2) on the second portion of the disk for the first time in response to automatic initiation by the disk drive after the disk drive is manufactured at the factory and while the disk drive is installed and operating in the computer system.

90. The disk drive of claim 89 wherein the manufacture test process includes at least one of flaw mapping, embedded runout compensation (ERC) and final drive verification.

91. The disk drive of claim 89 wherein the manufacture test process includes the flaw mapping.

92. The disk drive of claim 91 wherein the controller executes the flaw mapping on the second portion of the disk such that a first flaw mapping test is performed when a user command for operating the disk drive is pending and a second flaw mapping test is performed when the computer system is idle.

93. The disk drive of claim 92 wherein the first flaw mapping test is performed by identifying logical block addresses (LBAs) on the disk, determining whether the identified LBAs have been processed, and if the identified LBAs have not been processed, performing a write/verify on each of the LBAs.

94. The disk drive of claim 92 wherein the second flaw mapping test is performed by identifying an increment of logical block addresses (LBAs) which are unprocessed, performing a write/verify on each of the LBAs in the increment, and updating which of the LBAs have been processed.

95. The disk drive of claim 92 wherein:
the first flaw mapping test is performed by identifying logical block addresses (LBAs) on the disk, determining whether the identified LBAs have been processed, and if the identified LBAs have not been processed, performing a write/verify on each of the LBAs; and
the second flaw mapping test is performed by identifying an increment of logical block addresses (LBAs) which are unprocessed, performing a write/verify on each of the LBAs in the increment, and indicating which of the LBAs have been processed.

96. The disk drive of claim 89 wherein the manufacture test process includes the ERC.

97. The disk drive of claim 96 wherein the controller executes the ERC by determining which cylinder was last processed, performing the ERC on the next cylinder, and indicating completion of the ERC on the next cylinder.

98. The disk drive of claim 89 wherein the manufacture test process includes the final drive verification.

99. The disk drive of claim 98 wherein the controller executes the final drive verification such that a first final drive verification test is performed when a user command for operating the disk drive is pending and a second final drive verification test when the computer system is idle.

100. The disk drive of claim 99 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

101. The disk drive of claim 99 wherein the second final drive verification test is performed by identifying an increment of logical block addresses (LBAs) which are unprocessed, performing a write/verify on each of the LBAs in the increment, and indicating which of the LBAs have been processed.

102. The disk drive of claim 99 wherein:
the first final drive verification test is performed by identifying logical block addresses (LBAs) on the disk to which information is to be written, determining whether the identified LBAs have been processed, and if the identified LBAs have not been processed, performing a write/verify on each of the LBAs; and
the second final drive verification test is performed by identifying an increment of logical block addresses (LBAs) which are unprocessed, performing a write/ verify on each of the LBAs in the increment, and indicating which of the LBAs have been processed.

103. The disk drive of claim 89 wherein the controller executes the manufacture test process on the first portion of the disk such that any major flaws in the disk are detected.

104. The disk drive of claim 89 wherein the first portion of the disk includes a predetermined percentage of the tracks as well as every Nth of the tracks.

105. The disk drive of claim 89 wherein the manufacture test process is stored in a random access memory (RAM) in the disk drive.

106. The disk drive of claim 89 wherein the manufacture test process is stored in a read only memory (ROM) in the disk drive.

107. The disk drive of claim 89 wherein the manufacture test process is stored in the first portion of the disk.

108. The disk drive of claim 89 wherein the first portion of the disk is smaller than the second portion of the disk.

109. A disk drive, comprising:
a disk with spaced tracks for storing information;
a head that reads and writes information to and from the disk; and
a controller that executes a manufacture test process stored in the disk drive (1) on a first portion of the disk and not a second portion of the disk while the disk drive is manufactured at a factory and before the disk drive is delivered from the factory and installed and operating in a computer system, and (2) on the second portion of the disk for the first time in response to automatic initiation by the disk drive after the disk drive is manufactured at and delivered from the factory and while the disk drive is installed and operating in the computer system, thereby reducing manufacturing time for the disk drive at the factory.

110. The disk drive of claim 109 wherein the manufacture test process includes at least one of flaw mapping, embedded runout compensation (ERC) and final drive verification.

111. The disk drive of claim 109 wherein the manufacture test process includes the flaw mapping.

112. The disk drive of claim 111 wherein the controller executes the flaw mapping on the second portion of the disk such that a first flaw mapping test is performed when a user command for operating the disk drive is pending and a second flaw mapping test is performed when the computer system is idle.

113. The disk drive of claim 112 wherein the first flaw mapping test is performed by identifying logical block addresses (LBAs) on the disk, determining whether the identified LBAs have been processed, and if the identified LBAs have not been processed, performing a write/verify on each of the LBAs.

114. The disk drive of claim 112 wherein the second flaw mapping test is performed by identifying an increment of logical block addresses (LBAs) which are unprocessed, performing a write/verify on each of the LBAs in the increment, and updating which of the LBAs have been processed.

115. The disk drive of claim 112 wherein:
the first flaw mapping test is performed by identifying logical block addresses (LBAs) on the disk, determining whether the identified LBAs have been processed, and if the identified LBAs have not been processed, performing a write/verify on each of the LBAs; and
the second flaw mapping test is performed by identifying an increment of logical block addresses (LBAs) which are unprocessed, performing a write/verify on each of the LBAs in the increment, and indicating which of the LBAs have been processed.

116. The disk drive of claim 109 wherein the manufacture test process includes the ERC.

117. The disk drive of claim 116 wherein the controller executes the ERC by determining which cylinder was last processed, performing the ERC on the next cylinder, and indicating completion of the ERC on the next cylinder.

118. The disk drive of claim 109 wherein the manufacture test process includes the final drive verification.

119. The disk drive of claim 118 wherein the controller executes the final drive verification such that a first final drive verification test is performed when a user command for operating the disk drive is pending and a second final drive verification test when the computer system is idle.

120. The disk drive of claim 119 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

121. The disk drive of claim 119 wherein the second final drive verification test is performed by identifying an increment of logical block addresses (LBAs) which are unprocessed, performing a write/verify on each of the LBAs in the increment, and indicating which of the LBAs have been processed.

122. The disk drive of claim 119 wherein:
the first final drive verification test is performed by identifying logical block addresses (LBAs) on the disk to which information is to be written, determining whether the identified LBAs have been processed, and if the identified LBAs have not been processed, performing a write/verify on each of the LBAs; and
the second final drive verification test is performed by identifying an increment of logical block addresses (LBAs) which are unprocessed, performing a write/ verify on each of the LBAs in the increment, and indicating which of the LBAs have been processed.

123. The disk drive of claim 109 wherein the controller executes the manufacture test process on the first portion of the disk such that any major flaws in the disk are detected.

124. The disk drive of claim 109 wherein the first portion of the disk includes a predetermined percentage of the tracks as well as every Nth of the tracks.

125. The disk drive of claim 109 wherein the manufacture test process is stored in a random access memory (RAM) in the disk drive.

126. The disk drive of claim 109 wherein the manufacture test process is stored in a read only memory (ROM) in the disk drive.

127. The disk drive of claim 109 wherein the manufacture test process is stored in the first portion of the disk.

128. The disk drive of claim 109 wherein the first portion of the disk is smaller than the second portion of the disk.

129. A disk drive, comprising:
a disk with spaced tracks for storing information;
a head that reads and writes information to and from the disk;
a controller that executes a manufacture test process stored in the disk drive (1) on a first portion of the disk and not a second portion of the disk using the head while the disk drive is manufactured at a factory and before the disk drive is installed and operating in a computer system, and (2) on the second portion of the disk for the first time using the head in response to automatic initiation by the disk drive after the disk drive is manufactured at the factory and while the disk drive is installed and operating in the computer system.

130. The disk drive of claim 129 wherein the manufacture test process includes at least one of flaw mapping, embedded runout compensation (ERC) and final drive verification.

131. The disk drive of claim 129 wherein the manufacture test process includes the flaw mapping.

132. The disk drive of claim 131 wherein the controller executes the flaw mapping on the second portion of the disk such that a first flaw mapping test is performed when a user command for operating the disk drive is pending and a second flaw mapping test is performed when the computer system is idle.

133. The disk drive of claim 132 wherein the first flaw mapping test is performed by identifying logical block addresses (LBAs) on the disk, determining whether the identified LBAs have been processed, and if the identified LBAs have not been processed, performing a write/verify on each of the LBAs.

134. The disk drive of claim 132 wherein the second flaw mapping test is performed by identifying an increment of logical block addresses (LBAs) which are unprocessed, performing a write/verify on each of the LBAs in the increment, and updating which of the LBAs have been processed.

135. The disk drive of claim 132 wherein:
the first flaw mapping test is performed by identifying logical block addresses (LBAs) on the disk, determining whether the identified LBAs have been processed, and if the identified LBAs have not been processed, performing a write/verify on each of the LBAs; and
the second flaw mapping test is performed by identifying an increment of logical block addresses (LBAs) which are unprocessed, performing a write/verify on each of the LBAs in the increment, and indicating which of the LBAs have been processed.

136. The disk drive of claim 129 wherein the manufacture test process includes the ERC.

137. The disk drive of claim 136 wherein the controller executes the ERC by determining which cylinder was last processed, performing the ERC on the next cylinder, and indicating completion of the ERC on the next cylinder.

138. The disk drive of claim 129 wherein the manufacture test process includes the final drive verification.

139. The disk drive of claim 138 wherein the controller executes the final drive verification such that a first final drive verification test is performed when a user command for operating the disk drive is pending and a second final drive verification test when the computer system is idle.

140. The disk drive of claim 139 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

141. The disk drive of claim 139 wherein the second final drive verification test is performed by identifying an increment of logical block addresses (LBAs) which are unprocessed, performing a write/verify on each of the LBAs in the increment, and indicating which of the LBAs have been processed.

142. The disk drive of claim 139 wherein:
the first final drive verification test is performed by identifying logical block addresses (LBAs) on the disk to which information is to be written, determining whether the identified LBAs have been processed, and if the identified LBAs have not been processed, performing a write/verify on each of the LBAs; and
the second final drive verification test is performed by identifying an increment of logical block addresses (LBAs) which are unprocessed, performing a write/verify on each of the LBAs in the increment, and indicating which of the LBAs have been processed.

143. The disk drive of claim 129 wherein the controller executes the manufacture test process on the first portion of the disk such that any major flaws in the disk are detected.

144. The disk drive of claim 129 wherein the first portion of the disk includes a predetermined percentage of the tracks as well as every Nth of the tracks.

145. The disk drive of claim 129 wherein the manufacture test process is stored in a random access memory (RAM) in the disk drive.

146. The disk drive of claim 129 wherein the manufacture test process is stored in a read only memory (ROM) in the disk drive.

147. The disk drive of claim 129 wherein the manufacture test process is stored in the first portion of the disk.

148. The disk drive of claim 129 wherein the first portion of the disk is smaller than the second portion of the disk.

149. An automated manufacture process test system resident upon a disk drive that performs a manufacture test process on the disk drive once the disk drive is installed and operating within a computer system, the test system comprising:
a monitor that determines whether any user command from the computer system is pending or the computer system is idle;
a processing module that performs the manufacture test process on a disk of the disk drive, wherein the manufacture test process is performed on a portion of the disk for the first time and in a particular manner depending on whether the computer system has issued the user command or the computer system is idle, the manufacture test process includes at least one of flaw mapping, embedded runout compensation (ERC) and final drive verification, and the processing module performs the final drive verification such that a first final drive verification test is performed when a user command for operating the disk drive is pending and a second final drive verification test is performed when the computer system is idle; and
a controller that tracks performance of the manufacture test process such that counters stored in a memory of the disk drive indicate which portion of the disk has been processed by the manufacture test process.

150. The system of claim 149 wherein the processing module performs the flaw mapping such that a first flaw mapping test is performed when a user command for operating the disk drive is pending and a second flaw mapping test is performed when the computer is system is idle, and the first flaw mapping test is performed by identifying logical block addresses (LBAs) on the disk to which information is to be written, determining whether the identified LBAs have been processed, and if the identified LBAs have not been processed, performing a write/verify on each of the LBAs.

151. The system of claim 149 wherein the processing module performs the flaw mapping such that a first flaw mapping test is performed when a user command for operating the disk drive is pending and a second flaw mapping test is performed when the computer is system is idle, and the second flaw mapping test is performed by accessing the memory and identifying an increment of logical block addresses (LBAs) which are unprocessed, performing a write/verify on each of the LBAs in the increment, and updating the memory to indicate which of the LBAs have been processed.

152. The system of claim 149 wherein the processing module performs the ERC when the computer system is idle by accessing the memory to determine which cylinder was last processed, performing the ERC on the next cylinder, and updating the memory to indicate completion of the ERC on the next cylinder.

153. The system of claim 149 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

154. The system of claim 149 wherein the second final drive verification test is performed by accessing the memory and identifying an increment of logical block addresses (LBAs) which are unprocessed, performing a write/verify on each of the LBAs in the increment, and updating the memory to indicate which of the LBAs have been processed.

155. The system of claim 149 wherein a predetermined portion of the disk is processed by the manufacture test process before installation of the disk drive in the computer system, and the portion of the disk drive which has been processed is identified by the controller.

156. The system of claim 155 wherein any major flaw in the disk is detected before the disk drive is installed in the computer system.

157. The system of claim 155 wherein the disk includes concentric tracks and the predetermined portion includes a predetermined percentage of the tracks as well as every Nth of the tracks.

158. A method of performing a manufacture test process for a disk drive, comprising:
  installing the disk drive in a computer system and employing the disk drive for operations of the computer system after the disk drive leaves a factory; then
  detecting a predetermined condition in the computer system;
  performing a manufacture test process on a particular area of a disk of the disk drive for the first time in response to the detected condition, wherein the manufacture test process is performed in accordance with information stored in a memory of the disk drive which indicates where the manufacture test process shall begin and end, the manufacture test process corrects errors detected on the disk, the manufacture test process includes at least one of flaw mapping, embedded runout compensation (ERC) and final drive verification, and the final drive verification includes:
    determining the detected condition for the computer system;
    if the user command is pending, before performing the user command:
      identifying logical block addresses (LBAs) employed as part of performing the user command;
      accessing the memory to determine if the identified logical block addresses have been previously processed;
      if any of the LBAs are unprocessed, performing a write/verify on each of the unprocessed LBAs and reassigning any of the unprocessed LBAs which fail the write/verify; and
      updating the memory to indicate which of the unprocessed LBAs have been processed;
    if the computer system is idle:
      accessing the memory and identifying a next increment of LBAs to process;
      performing the read/verify on each of the LBAs in the increment;
      reassigning the LBAs in the increment which fail the read/verify; and
      updating the memory to indicate that the LBAs in the increment have been processed; and
  updating the memory to indicate upon which portions of the disk the manufacture test process has been performed.

159. The method of claim 158 wherein the detected condition includes a user command pending from the computer system and the computer system is idle.

160. The method of claim 158 wherein the ERC includes:
  determining the detected condition for the computer system; and
  if the computer system is idle:
    accessing the memory and identifying a next cylinder to process;
    performing the ERC on the next cylinder, and storing in the memory any generated error values; and
    updating the memory to indicate that the next cylinder has been processed.

161. The method of claim 158 including performing the manufacture test process prior to installation of the disk drive in the computer system to identify a major flaw on the disk.

162. The method of claim 158 wherein a program for performing the manufacturing test process is placed in the memory before installing the disk drive in the computer system.

163. A method of performing a manufacture test process for a disk drive, comprising:
  performing a manufacture test process on a disk of the disk drive prior to installation of the disk drive in a computer system to identify a major flaw on the disk, wherein the manufacture test process is performed in accordance with information stored in a memory of the disk drive which indicates where the manufacture test process shall begin and end, the manufacture test process corrects errors detected on the disk, the disk includes concentric tracks, and performing the manufacture test process prior to installation of the disk drive in the computer system includes testing a predetermined percentage of the tracks as well as every Nth track of the tracks; then
  installing the disk drive in the computer system and employing the disk drive for operations of the computer system after the disk drive leaves a factory; then
  detecting a predetermined condition in the computer system;
  performing the manufacture test process on a particular area of the disk for the first time in response to the detected condition; and
  updating the memory to indicate upon which portions of the disk the manufacture test process has been performed.

164. The method of claim 161 wherein the disk includes concentric tracks and performing the manufacture test process prior to installation of the disk drive in the computer system includes testing a predetermined percentage of the tracks as well as every Nth track of the tracks.

165. The method of claim 163 wherein the manufacture test process includes at least one of flaw mapping, embedded runout compensation (ERC) and final drive verification.

166. The method of claim 165 wherein the detected condition includes a user command pending from the computer system and the computer system is idle.

167. The method of claim 165 wherein the ERC includes:
  determining the detected condition for the computer system; and
  if the computer system is idle:
    accessing the memory and identifying a next cylinder to process;
    performing the ERC on the next cylinder, and storing in the memory any generated error values; and
    updating the memory to indicate that the next cylinder has been processed.

168. The method of claim 163 wherein a program for performing the manufacturing test process is placed in the memory before installing the disk drive in the computer system.

169. A disk drive, comprising:
  a disk with spaced tracks for storing information;
  a head that reads and writes information to and from the disk;
  a memory;
  a processing module stored in the memory that performs a manufacture test process on the disk while the disk drive is installed and operating in a computer system, wherein the manufacture test process includes at least one of flaw mapping, embedded runout compensation (ERC) and final drive verification, and the processing module performs the final drive verification such that a first final drive verification test is performed when a user command for operating the disk drive is pending and a second final drive verification test when the computer system is idle; and a controller that executes the manufacture test process on a portion of the disk for the first time in response to a predetermined condition of the computer system configured to control operation of the head when the computer system is idle.

170. The disk drive of claim 169 wherein the memory is a read only memory (ROM).

171. The disk drive of claim 169 wherein the memory is a processed area of the disk.

172. The disk drive of claim 169 wherein the processing module performs the flaw mapping such that a first flaw mapping test is performed when a user command for operating the disk drive is pending and a second flaw mapping test is performed when the computer system is idle, and the first flaw mapping test is performed by identifying logical block addresses (LBAs) on the disk, determining whether the identified LBAs have been processed, and if the identified LBAs have not been processed, performing a write/verify on each of the LBAs.

173. The disk drive of claim 169 wherein the processing module performs the flaw mapping such that a first flaw mapping test is performed when a user command for operating the disk drive is pending and a second flaw mapping test is performed when the computer system is idle, and the second flaw mapping test is performed by accessing the memory and identifying an increment of logical block addresses (LBAs) which are unprocessed, performing a write/verify on each of the LBAs in the increment, and updating the memory to indicate which of the LBAs have been processed.

174. The disk drive of claim 169 wherein the processing module performs the ERC when the computer system is idle by accessing the memory to determine which cylinder was last processed, performing the ERC on the next cylinder, and updating the memory to indicate completion of the ERC on the next cylinder.

175. The disk drive of claim 169 wherein the first final drive verification test is performed by identifying logical block addresses (LBAs) on the disk to which information is to be written, determining whether the identified LBAs have been processed, and if the identified LBAs have not been processed, performing a write/verify on each of the LBAs.

176. The disk drive of claim 169 wherein the second final drive verification test is performed by accessing memory and identifying an increment of logical block addresses (LBAs) which are unprocessed, performing a write/verify on each of the LBAs in the increment, and updating the memory to indicate which of the LBAs have been processed.

177. The disk drive of claim 169 wherein the disk drive performs the manufacture test process on a predetermined portion of the disk before the disk drive is installed in the computer system.

178. The disk drive of claim 177 wherein the disk drive detects any major flaws in the disk before the disk drive is installed in the computer system.

179. The disk drive of claim 177 wherein the predetermined portion includes a predetermined percentage of the tracks as well as every Nth of the tracks.

180. A disk drive, comprising:
a disk with spaced tracks for storing information;
a head that reads and writes information to and from the disk;
a memory;
a processing module stored in the memory that performs a manufacture test process on the disk while the disk drive is installed and operating in a computer system; and
a controller that executes the manufacture test process on a portion of the disk for the first time in response to a predetermined condition of the computer system configured to control operation of the head when the computer system is idle;
wherein the disk drive performs the manufacture test process on a predetermined portion of the disk before the disk drive is installed in the computer system, and the predetermined portion includes a predetermined percentage of the tracks as well as every Nth of the tracks.

181. The disk drive of claim 180 wherein the memory is a read only memory (ROM).

182. The disk drive of claim 180 wherein the memory is a processed area of the disk.

183. The disk drive of claim 180 wherein the manufacture test process includes at least one of flaw mapping, embedded runout compensation (ERC) and final drive verification.

184. The disk drive of claim 183 wherein the processing module performs the flaw mapping such that a first flaw mapping test is performed when a user command for operating the disk drive is pending and a second flaw mapping test is performed when the computer system is idle, and the first flaw mapping test is performed by identifying logical block addresses (LBAs) on the disk, determining whether the identified LBAs have been processed, and if the identified LBAs have not been processed, performing a write/verify on each of the LBAs.

185. The disk drive of claim 183 wherein the processing module performs the flaw mapping such that a first flaw mapping test is performed when a user command for operating the disk drive is pending and a second flaw mapping test is performed when the computer system is idle, and the second flaw mapping test is performed by accessing the memory and identifying an increment of logical block addresses (LBAs) which are unprocessed, performing a write/verify on each of the LBAs in the increment, and updating the memory to indicate which of the LBAs have been processed.

186. The disk drive of claim 183 wherein the processing module performs the ERC when the computer system is idle by accessing the memory to determine which cylinder was last processed, performing the ERC on the next cylinder, and updating the memory to indicate completion of the ERC on the next cylinder.

187. The disk drive of claim 183 wherein the processing module performs the final drive verification such that a first final drive verification test is performed when a user command for operating the disk drive is pending and a second final drive verification test when the computer system is idle, and the first final drive verification test is performed by identifying logical block addresses (LBAs) on the disk to which information is to be written, determining whether the identified LBAs have been processed, and if the identified LBAs have not been processed, performing a write/verify on each of the LBAs.

188. The disk drive of claim 183 wherein the processing module performs the final drive verification such that a first final drive verification test is performed when a user command for operating the disk drive is pending and a second final drive verification test when the computer system is idle, and the second final drive verification test is performed by accessing memory and identifying an increment of logical block addresses (LBAs) which are unprocessed, performing a write/verify on each of the LBAs in the increment, and updating the memory to indicate which of the LBAs have been processed.

189. The disk drive of claim 180 wherein the disk drive detects any major flaws in the disk before the disk drive is installed in the computer system.

* * * * *